United States Patent
Riani et al.

(10) Patent No.: US 8,489,970 B1
(45) Date of Patent: Jul. 16, 2013

(54) ITERATIVE PRBS SEED RECOVERY USING SOFT DECISIONS

(75) Inventors: Jamal Riani, Santa Clara, CA (US); Haoli Qian, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/614,397

(22) Filed: Sep. 13, 2012

Related U.S. Application Data

(63) Continuation of application No. 12/690,829, filed on Jan. 20, 2010, now Pat. No. 8,276,052.

(60) Provisional application No. 61/145,842, filed on Jan. 20, 2009.

(51) Int. Cl.
*H03M 13/03* (2006.01)
*H03M 13/00* (2006.01)
*G01R 31/28* (2006.01)
*H04L 27/08* (2006.01)
*H04L 12/26* (2006.01)
*H04B 17/00* (2006.01)

(52) U.S. Cl.
USPC .......... 714/794; 714/775; 714/795; 714/821; 714/739; 375/341; 370/216; 370/242; 455/226.1

(58) Field of Classification Search
USPC .......... 714/794, 775, 795, 821, 739; 375/341; 370/216, 242; 455/226.1
See application file for complete search history.

(56) References Cited

U.S. PATENT DOCUMENTS

| | | | |
|---|---|---|---|
| 6,618,395 B1 | 9/2003 | Kimmitt | |
| 6,816,992 B2 | 11/2004 | Eby | |
| 6,954,888 B2 | 10/2005 | Rajski et al. | |
| 7,000,167 B2 | 2/2006 | Coker et al. | |
| 7,136,428 B2 | 11/2006 | Corbaton et al. | |
| 7,178,080 B2 | 2/2007 | Hocevar | |
| 7,219,113 B2 | 5/2007 | Bonaccio et al. | |
| 7,404,115 B2 | 7/2008 | Boudon et al. | |
| 7,669,109 B2 | 2/2010 | Hocevar | |
| 8,028,216 B1 | 9/2011 | Yeo et al. | |
| 8,156,400 B1 | 4/2012 | Yeo et al. | |

(Continued)

OTHER PUBLICATIONS

"Part 3: Carrier Sense Multiple Access With Collision Detection (CSMAICD) Access Method and Physical Layer Specifications—Section 3", IEEE Information Technology, p. 1-379, 2002.

(Continued)

*Primary Examiner* — John J Tabone, Jr.

(57) ABSTRACT

A receiver includes a seed recovery module and a pseudo-random binary sequence generator. The seed recovery module is configured to receive a pseudo-random binary sequence and a signal including a seed value, recover the seed value from the signal using the pseudo-random binary sequence, and determine a likelihood that a bit of the seed value was recovered accurately. The pseudo-random binary sequence generator is configured to generate the pseudo-random binary sequence, and adjust the pseudo-random binary sequence based on the likelihood until the likelihood is greater than a threshold.

18 Claims, 4 Drawing Sheets

U.S. PATENT DOCUMENTS

| | | | |
|---|---|---|---|
| 8,276,052 B1* | 9/2012 | Riani et al. .................... | 714/794 |
| 8,296,637 B1* | 10/2012 | Varnica et al. ................. | 714/794 |
| 2006/0143549 A1 | 6/2006 | Yasumoto et al. | |
| 2007/0230632 A1* | 10/2007 | Bai et al. ....................... | 375/341 |
| 2007/0258488 A1 | 11/2007 | Chang et al. | |
| 2009/0034597 A1 | 2/2009 | Kobayashi et al. | |
| 2009/0125780 A1 | 5/2009 | Taylor et al. | |
| 2010/0011240 A1 | 1/2010 | Landolt | |
| 2010/0180173 A1* | 7/2010 | Batra et al. .................... | 714/751 |
| 2011/0197112 A1 | 8/2011 | Parthasarathy et al. | |
| 2011/0222609 A1 | 9/2011 | Limberg | |
| 2012/0089890 A1 | 4/2012 | Palanki et al. | |

OTHER PUBLICATIONS

"Part 3: Carrier Sense Multiple Access With Collision Detection (CSMAICD) Access Method and Physical Layer Specifications", IEEE Information Technology, p. 1-578, Mar. 2002.

"Part 3: Carrier Sense Multiple Access With Collision Detection (CSMAICD) Access Method and Physical Layer Specifications—Section 2", IEEE Information Technology, p. 1-582, 2002.

Li et al., An Improved Bit-Flipping Scheme to Achieve Run Length Control in Coded Systems, Oct. 2005, IEEE, vol. 41, No. 10, pp. 2980-2982.

\* cited by examiner

ITERATIVE PRBS SEED RECOVERY USING SOFT DECISIONS

CROSS-REFERENCE TO RELATED APPLICATIONS

This application is a continuation of U.S. patent application Ser. No. 12/690,829 (now U.S. Pat. No. 8,276,052), filed on Jan. 20, 2010, which claims the benefit of U.S. Provisional Application No. 61/145,842, filed on Jan. 20, 2009. The entire disclosures of the above applications are incorporated herein by reference.

FIELD

Aspects of the present invention relate generally to Pseudo-Random Binary Sequences (PRBS) and more specifically to seed recovery for use in a PRBS generator.

DESCRIPTION OF THE RELATED ART

Pseudo-Random Binary Sequences (PRBS) are used in many aspects of telecommunication, encryption, and simulation. In Ethernet Backplane systems, and in accordance with IEEE 802.3ap, a PRBS is used to implement an initialization protocol to begin communications between a transmitter device and a receiver device. The initialization protocol is used for timing recovery to optimize the analog to digital converter sampling instants, setting the DC compensation loop, setting the gain loop, training of the equalizer, and other adaptation loops.

A transmitter in a conventional Ethernet Backplane system outputs pseudo-random data, as generated by a PRBS generator with a random seed, onto the channel as part of an initialization protocol. A receiver may then receive from the transmitter a signal containing a training sequence as part of the initialization protocol. The training sequence allows the receiver to recover a random seed such that a PRBS locally created at the receiver can be synchronized with the PRBS generated at the transmitter. Once the seed is recovered, an equalizer at the receiver can be trained to remove or condition interference accumulated in a received signal during communication between transmitter and receiver.

The seed is required to be random in order to de-correlate crosstalk signals, thereby reducing the likelihood of synchronization between victim and aggressors. However, there is only a limited time, and limited amount of training data with which to recover the seed and train the equalizer before a new training frame with a new random seed is transmitted. Therefore an efficient method for recovering the seed value of the Pseudo-Random Binary Sequence may be desirable in some circumstances.

SUMMARY

A system and method for recovering the seed of a pseudo-random binary sequence (PRBS) using soft decisions is disclosed. In some implementations, a log-likelihood ratio may be calculated to determine the certainty with which each bit in the seed has been recovered, and in some implementations, the value of the PRBS may be used in the calculation of the log-likelihood ratio. In implementations with a threshold, the seed may have been accurately recovered when the magnitude of the log-likelihood ratio for each bit in the sequence is above the threshold. In some implementations, a linear feedback shift register may store the log-likelihood ratio for each bit in the sequence and the output of the linear feedback shift register may be combined with the value of the PRBS in the calculation of the log-likelihood ratio.

BRIEF DESCRIPTION OF DRAWINGS

The present invention is described herein with reference to the accompanying drawings, in which similar reference numbers are used to indicate functionally similar elements. The foregoing and other aspects of various embodiments of the present invention will be apparent through examination of the following detailed description thereof in conjunction with the accompanying drawing figures.

DESCRIPTION

Figure 1:
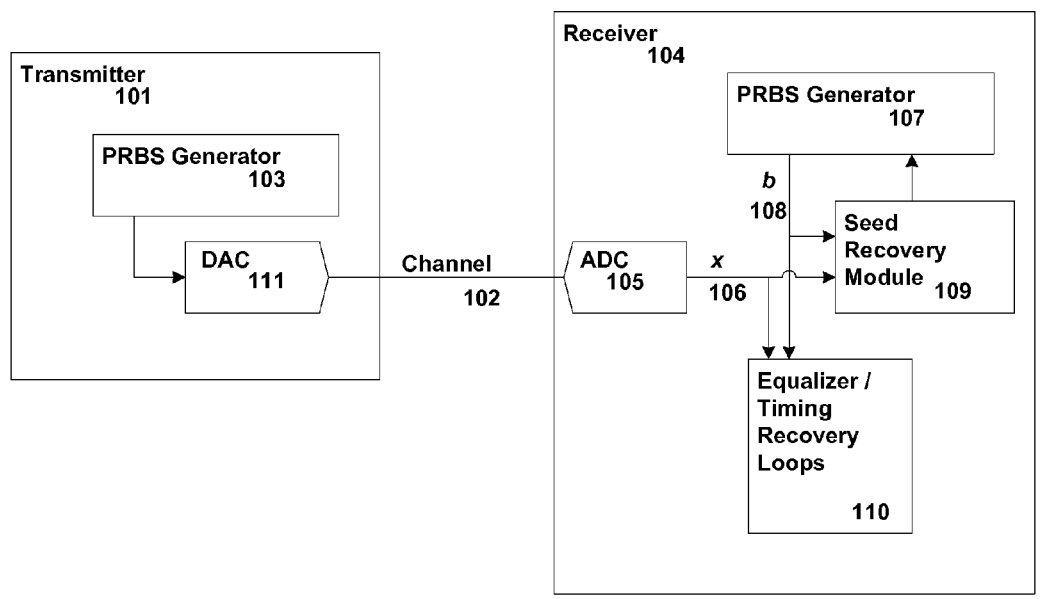
FIG. 1 is a simplified block diagram illustrating a system model for a conventional Ethernet Backplane connection.

FIG. 1 is a simplified block diagram illustrating a system model for a conventional 10G-KR Ethernet Backplane connection. As shown in FIG. 1, a transmitter 101 may be coupled to a receiver 104 via a channel 102. Channel 102 may be any backplane connector compliant with IEEE 802.3. Transmitter 101 includes a Pseudo-Random Binary Sequence (PRBS) generator 103 that generates a pseudo-random binary sequence using a random seed. If generator 103 is a PRBS11 generator, the generated sequence G(x) may be represented by the polynomial of Equation 1.

$$G(x) = 1 + x^9 + x^{11} \tag{1}$$

Once a PRBS signal is generated by generator 103, transmitter 101 converts the binary sequence to an analog signal with digital to analog converter (DAC) 111 and transmits the signal to receiver 104 via channel 102. The signal received by receiver 104 may be different than the signal sent by transmitter 101 due to the deterioration of the signal due to inter-symbol interference or the addition of noise during transmission over channel 102. Receiver 104 then converts the received analog signal to digital signal $x_k$ 106 with analog to digital converter (ADC) 105.

As shown in FIG. 1, PRBS generator 107 in receiver 104 generates a binary sequence that also may be represented by Equation 1. When the correct seed is found in 104, the generated binary sequence may be represented by signal $b_k$ 108 where $x_k = ab_k + \text{interference} + \text{noise}$. To recover the seed value used by generator 103, signal $b_k$ 108 is synchronized with received digital signal $x_k$ 106 using seed recovery module 109. Seed recovery module 109 may simply try all $2^{11}$ different possible seed values to generate a binary sequence at PRBS generator 107. The seed that generates a PRBS that has the highest correlation with the received signal $x_k$ 106 is the recovered seed. Once the recovered seed is determined, the PRBS generated by generator 107 using the recovered seed is used together with received signal $x_k$ 106 to generate an error signal. The error signal may then be used to lock timing recovery loop, train equalizer and adaptation loops 110, and to eliminate or condition inter-symbol interference in future received signals.

Figure 2:
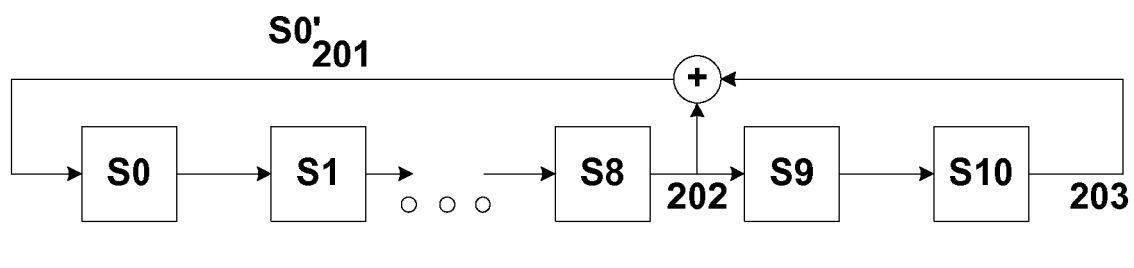
FIG. 2 is a simplified block diagram illustrating one embodiment of a PRBS generator using a linear feedback shift register.

FIG. 2 is a simplified block diagram illustrating one embodiment of a PRBS generator using a linear feedback shift register. The generator shown in FIG. 2 implements the polynomial of Equation 1. $S_0$ is the input bit and $S_0$ is the output bit. Each position, or tap, in the shift register represents a state of a bit in the PRBS. The next input $S_0'$ 201 into the shift register for $S_0$ is calculated as the XOR value of the value (202) in the position in the shift register for $S_8$ and the value (203) in the position in the shift register for $S_{10}$, the XOR value of the output taps (accordingly, $S_0' = S_8$ XOR $S_{10}$). After the input is calculated for $S_0'$ 201, the rest of the values in the shift register are each shifted to the right, such that $S_i' = S_{i-1}$.

Figure 3:
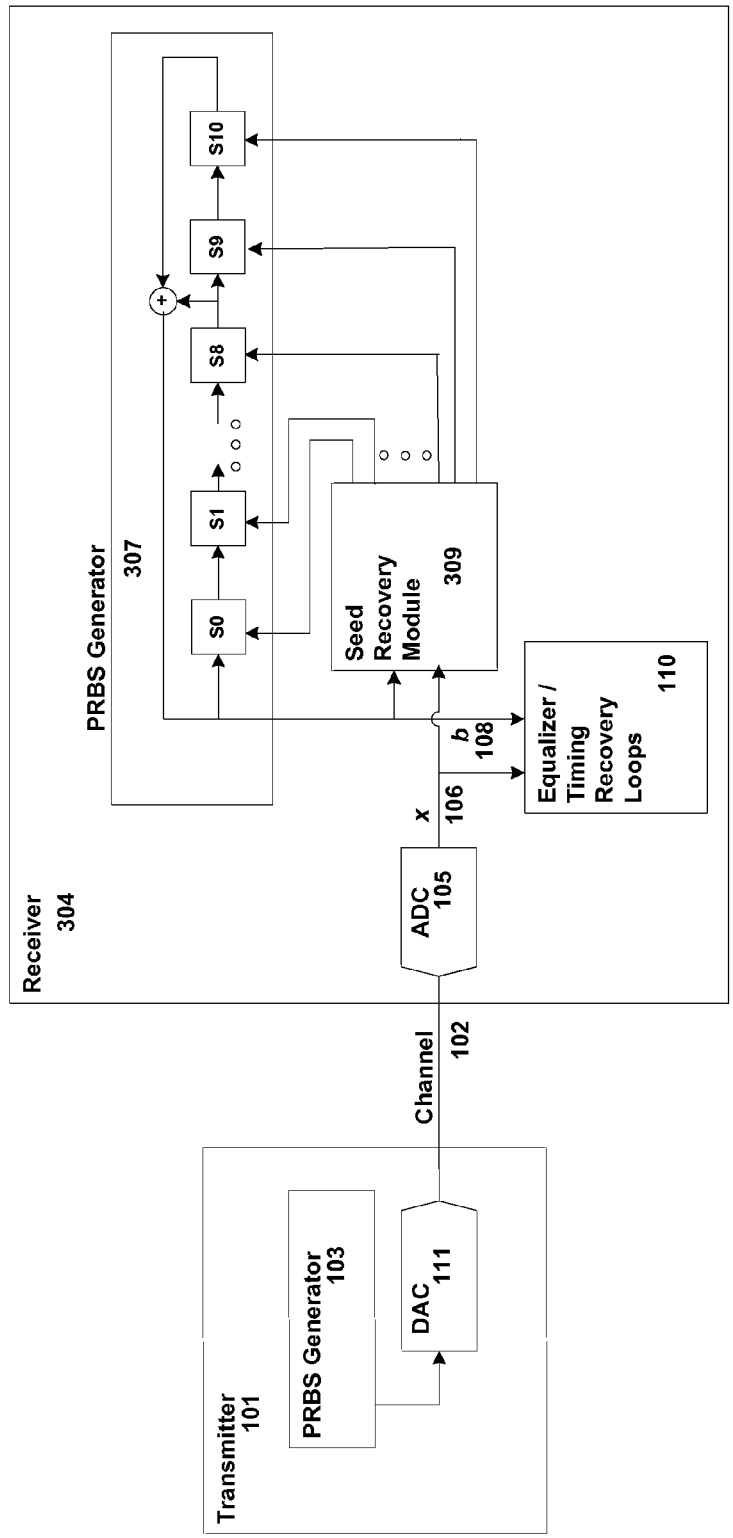
FIG. 3 is a simplified block diagram illustrating a system model for one embodiment of an Ethernet Backplane connection using soft decisions for iterative seed recovery.

FIG. 3 is a simplified block diagram illustrating a system model for one embodiment of a 10G-KR Ethernet Backplane connection using soft decisions for iterative seed recovery. Information obtained from the received signal may be used in this system to synchronize PRBS generator output with the received signal and thereby to recover a seed value for a PRBS generator.

Transmitter 101, channel 102, generator 103, ADC 105, DAC 111, and equalizer and adaptation loops 110 may each be unchanged from those described in the conventional system model illustrated in FIG. 1. Receiver 304, however, uses a new seed recovery module 309 and PRBS generator 307 to recover the seed.

In one embodiment, to recover the seed, a log-likelihood ratio (LLR) $L_0, L_1, \ldots, L_{10}$ may be used for each state bit $S_0, S_1, \ldots, S_{10}$ where $L_i$ is given by Equation 2 and where the state S can be either +1 or −1.

$$L_i = \log\left(\frac{Pr(S_i = 1)}{Pr(S_i = -1)}\right) \quad (2)$$

Where $Pr(S_i=1)$ represents the probability that $S_i=1$ and the LLR values are updated using PRBS generator 307 as depicted in FIG. 3. The LLR value may be understood to represent the likelihood that a bit in the PRBS is a −1 or a +1. If the bit is represented by a positive LLR value, then the bit is likely a 1. If a negative LLR value, then the bit is likely a −1.

In one embodiment, the LLR value may alternately be calculated to represent the likelihood that a bit in the PRBS is a 0 or a 1. Then iterative PRBS seed recovery may be implemented with the equations used in the calculation of the LLR value adjusted to account for 0 and 1 rather than a −1 and +1.

PRBS generator 307 may use a linear feedback shift register similar to the one depicted in FIG. 2, but the values stored in the shift register may be the LLR values associated with each bit in the sequence rather than the estimated bit values and the input bit is more than $S_8$ XOR $S_{10}$. As such, the values input into the linear feedback shift register may comprise more than 1 bit. In one embodiment, the values stored in the linear feedback shift register comprise 4 bits representative of the respective LLR value.

PRBS generator 307 may use information obtained from received digital signal $x_k$ 106 as well as a combination of the LLR values stored in shift registers for $S_8$ and $S_{10}$ to update the LLR values stored in the shift registers and generate the next sequence with which to attempt PRBS synchronization. The information obtained from received digital signal $x_k$ 106 may be soft information representative of the value of the received digital signal $x_k$ 106. When using the soft information provided in received digital signal $x_k$ 106 to determine the next input bit $L_0$, $L_0$ may then be proven to be optimally determined as in Equation 3.

$$L_0^{(k)} = Kx_k + \log\left(\frac{1 + \exp(L_8^{(k-1)} + L_{10}^{(k-1)})}{\exp(L_8^{(k-1)}) + \exp(L_{10}^{(k-1)})}\right) \quad (3)$$

Where $L_8$ and $L_{10}$ represent the LLR values for $S_8$ and $S_{10}$, and K is a constant.

In one embodiment, if the noise in channel 102 is additive white Gaussian noise, then the optimal value for constant K may be determined as the inverse of the noise variance.

A simplified approximation of Equation 3 may be determined as Equation 4.

$$L_0^{(k)} = Kx_k + \mathrm{sign}(L_8^{(k-1)}) * \mathrm{sign}(L_{10}^{(k-1)}) * \min(|L_8^{(k-1)}|, |L_{10}^{(k-1)}|) \quad (4)$$

Therefore, the LLR value representing $S_0$ may be determined by a combination of the received digital signal $x_k$ 106, the sign (positive or negative) of the output taps $L_8$ and $L_{10}$, and the smaller of the absolute value of $L_8$ and $L_{10}$. The absolute value, or magnitude, of the LLR value may be employed in some implementations because the magnitude of an LLR value may generally represent the certainty that the bit represented by the LLR value can be estimated as either a −1 or a +1. Then, if an LLR value is small, the certainty that the bit represented by an LLR value is a −1 or a +1 is generally low. In contrast, if the magnitude of an LLR value is relatively large, then the certainty that the bit represented by that LLR value is a −1 or a +1 is relatively higher. The minimum of the magnitudes of $L_8$ and $L_{10}$ may be used because a smaller value represents less certainty. Where the magnitudes of both $L_8$ and $L_{10}$ are small, digital signal $x_k$ 106 has more weight than in the case where either $L_8$ or $L_{10}$ have larger magnitudes. In the former case, the certainty may be based primarily on the strength of received digital signal $x_k$ 106.

For all other LLR values, the value stored in the feedback shift register is shifted by one position; therefore the value of $L_i$ may be determined by Equation 5.

$$1 \leq \forall i \leq 10, L_i^{(k)} = L_{i-1}^{k-1} \quad (5)$$

If all LLR values for a sequence are above a threshold T, then the recovered seed may be taken as the corresponding binary sequence in accordance with Equation 6:

$$b_k = \mathrm{sign}(L_0^{(k)}) \quad (6)$$

where a negative value is indicative of a −1 and a positive value is indicative of a +1. If not all of the LLR values for a sequence are above threshold T, then the next LLR value for $L_0$ is calculated, using the next input signal $x_{k+1}$. The iterative process continues until all LLR values of a sequence are above threshold T, ensuring that the sequence bit values have been recovered with reasonable certainty.

Once the sequence bit values have been recovered with reasonable certainty, the recovered sequence may be established as the PRBS seed. When a seed is locked, PRBS generator 307 may continue to generate new sequences in accordance with Equation 1. The values stored in the linear feedback shift register may be limited to a single bit representing the sign of the PRBS bit. Those new sequences may be used together with the received digital signal to generate an error signal for the training of timing recovery, and equalizer and adaptation loops 110.

In one embodiment, constant K may be set in accordance with Equation 7 where ADC 105 takes values in the interval of [−A,A] set by the normalization of ADC 105 such that a high ADC value will correspond with a high LLR value and therefore greater certainty that the bit represented by the LLR value is accurately represented by a −1 or a +1.

$$K = \frac{T}{A} \quad (7)$$

In one embodiment, seed recovery module 309 and generator 307 may be implemented as a combination of hardware circuits and registers as appropriate. Additionally or alternatively, seed recovery module 309 and generator 307 may be embodied in or comprise one or more software modules or instruction sets implemented by a processing device (e.g., a multi-purpose microprocessor) to enable the functionality described above.

Figure 4:
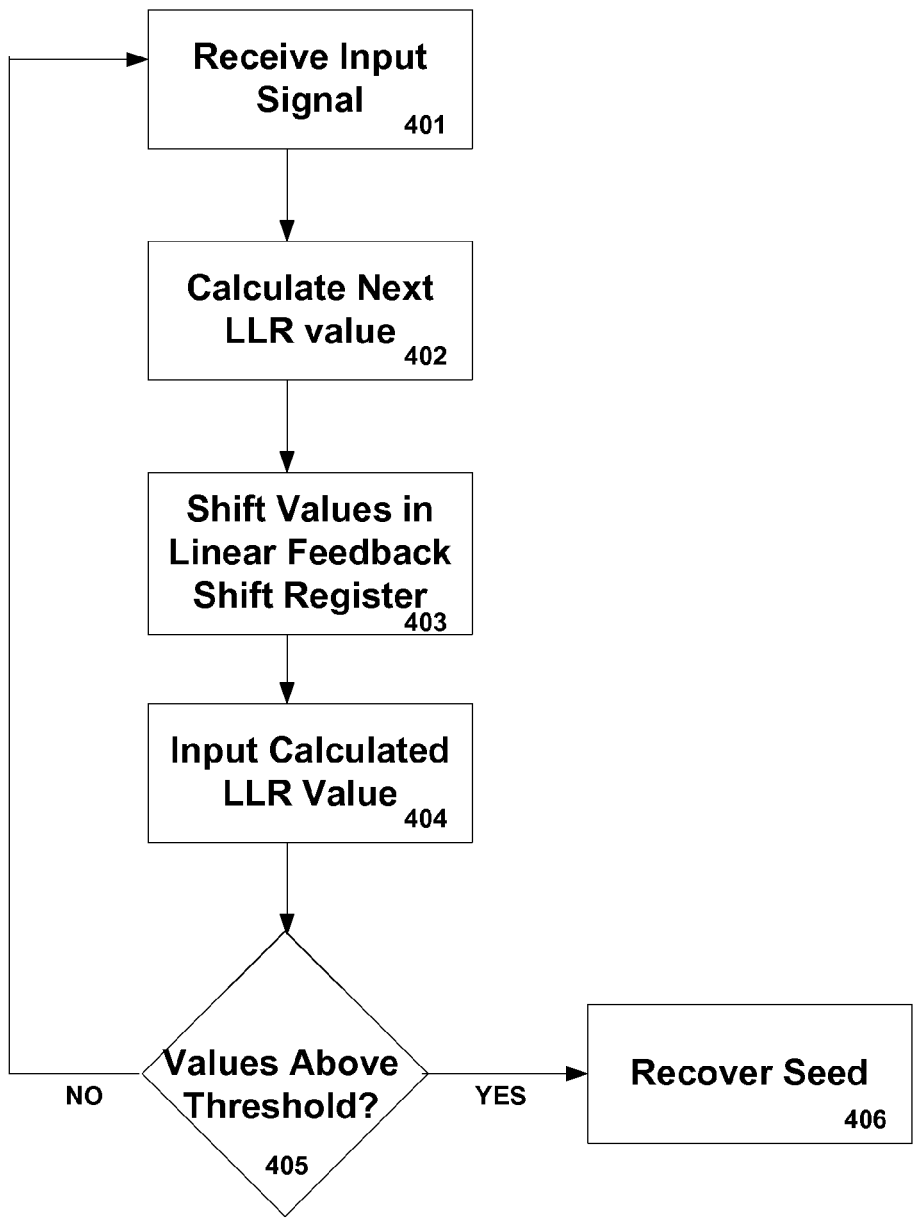
FIG. 4 is a simplified flow diagram illustrating general operation of one embodiment of a method of recovering a random seed value for a PRBS generator.

FIG. 4 is a simplified flow diagram illustrating general operation of one embodiment of a method of recovering a random seed value for a PRBS generator. The random seed is a pseudo-random binary sequence (PRBS) that may be recovered with a PRBS generator implemented with a linear feedback shift register. The values in the linear feedback shift register may contain more than one bit, and in one embodiment, comprise several bits.

As shown in FIG. 4, at 401, an input signal is received. The input signal may be an analog signal that, when converted to a digital signal, may contain a sequence with which the generated PRBS is to be synchronized. This synchronization allows a PRBS generator in the receiver to recover a seed used in the PRBS generator that is used to transmit the input sequence, such that the two different generators produce the same PRBS values. The synchronization is complete when the PRBS seed has been recovered.

At 402, after receiving the input signal at 401, a log-likelihood ratio (LLR) value may be calculated (e.g., in accordance with Equation 2 or via other appropriate computations). In some embodiments, the magnitude, or absolute value, of the LLR value represents the likelihood that the bit in the PRBS is a −1 or a +1, and the sign of the LLR value indicates whether the bit represented by that LLR value is a −1 or a +1. For example, the bit is a −1 if the LLR value is negative, and is a +1 if the LLR value is positive. The value of $L_0$ may be proven to be optimally calculated by Equation 3, though other calculations may have utility in certain circumstances, such as, for instance, in connection with systems having limited or over-taxed processing capabilities. In one embodiment, the constant value, K, used in Equation 3 at block 402 may be determined by Equation 7, where A is the magnitude of the analog input signal.

In one embodiment, where noise in the input signal is white additive Gaussian noise, the LLR value for the bit in the sequence represented by the input signal, i.e. the next input bit $L_0$, may be calculated, e.g., as set forth in Equation 4, though other computations are contemplated. Thus the LLR value is the input signal multiplied by a constant value and added to a combination of the sign of a first value, the sign of a second value, and the minimum of the magnitudes of the first value and the second value. In one embodiment, the constant may be calculated as the inverse of the noise variance.

Where the sequence stored in the shifter may be represented as $L_0, L_1, \ldots L_9, L_{10}$, then the first value may be $L_8$ (tap 8) and the second value may be $L_{10}$ (tap 10). The minimum of the absolute value of $L_8$ and $L_{10}$ is used as representing the certainty that the bit represented by the calculated LLR value is accurately estimated because a smaller magnitude means the state has been estimated with less certainty.

After a new LLR value has been calculated, at 403, the values stored in the shifter are shifted such that the shifted LLR values are determined, e.g., in accordance with Equation 5. At 404 the new LLR value can then be input into the shifter.

Once the values in the shifter have been updated, at 405 the magnitude of each LLR value can then be compared to a threshold value. The threshold value is a value that may represent the minimum acceptable certainty.

If the magnitude of all the values in the sequence stored in the shifter are above the threshold value, then at 406 the seed is locked and may then be recovered. If the LLR value is positive, the bit represented by that LLR value is a 1. If the LLR value is negative, the bit represented by that LLR value is a 0. The 11 bit sequence is a recovered seed that may be used to synchronize the PRBS generator at the receiver with the PRBS generator at the transmitter that generated the input signal.

It is noted that the arrangement of the blocks in FIG. 4 does not necessarily imply a particular order or sequence of events, nor is it intended to exclude other possibilities. For example, the operations depicted at 403 and 404 or at 401 and 402 may occur substantially simultaneously with each other.

Although PRBS seed recovery has primarily been described as part of the Ethernet Backplane initialization protocol, the above embodiments may be implemented in any system in which PRBS seed recovery is needed.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A receiver, comprising:
    a seed recovery module configured to
        receive i) a pseudo-random binary sequence, and ii) a signal including a seed value,
        recover the seed value from the signal using the pseudo-random binary sequence, and
        determine a likelihood that a bit of the seed value was recovered accurately; and
    a pseudo-random binary sequence generator configured to
        i) generate the pseudo-random binary sequence, and ii) adjust the pseudo-random binary sequence based on the likelihood until the likelihood is greater than a threshold.

2. The receiver of claim 1, wherein the likelihood is based on a log-likelihood ratio.

3. The receiver of claim 2, wherein the log-likelihood ratio includes a ratio of i) a first probability that the bit is a 1 to ii) a second probability that the bit is a −1 or a 0.

4. The receiver of claim 1, wherein the pseudo-random binary sequence generator includes a linear feedback shift register configured to store a plurality of the likelihoods for respective bits of the seed value.

5. The receiver of claim 4, wherein the seed recovery module is configured to determine the likelihood further based on a combination of a magnitude of the pseudo-random binary sequence and a predetermined value.

6. The receiver of claim 5, wherein:
    the linear feedback shift register includes a plurality of output taps; and
    the magnitude includes a combination of each sign of the plurality of output taps and a minimum of each magnitude of the plurality of output taps.

7. The receiver of claim 5, wherein the predetermined value is an inverse of a noise variance for a channel associated with transmission of the pseudo-random binary sequence.

8. The receiver of claim 5, further comprising an analog to digital converter configured to provide the signal to the seed recovery module, wherein:

the seed value is recovered when a respective likelihood for every bit in the pseudo-random binary sequence is greater than the threshold; and the predetermined value corresponds to the threshold divided by a magnitude of a normalized output range of the analog to digital converter.

9. The receiver of claim 1, wherein the seed value is recovered when a respective likelihood for every bit in the pseudo-random binary sequence is greater than the threshold.

10. A method for operating a receiver, the method comprising:
receiving i) a pseudo-random binary sequence, and ii) a signal including a seed value;
recovering the seed value from the signal using the pseudo-random binary sequence;
determining a likelihood that a bit of the seed value was recovered accurately; and
using a pseudo-random binary sequence generator,
storing the likelihood,
generating the pseudo-random binary sequence, and
adjusting the pseudo-random binary sequence based on the likelihood until the likelihood is greater than a threshold.

11. The method of claim 10, wherein the likelihood is based on a log-likelihood ratio.

12. The method of claim 11, wherein the log-likelihood ratio includes a ratio of i) a first probability that the bit is a 1 to ii) a second probability that the bit is a −1 or a 0.

13. The method of claim 10, wherein storing the likelihood includes using a linear feedback shift register to store a plurality of the likelihoods for respective bits of the seed value.

14. The method of claim 13, determining the likelihood includes determining the likelihood further based on a combination of a magnitude of the pseudo-random binary sequence and a predetermined value.

15. The method of claim 14, wherein:
the linear feedback shift register includes a plurality of output taps; and
the magnitude includes a combination of each sign of the plurality of output taps and a minimum of each magnitude of the plurality of output taps.

16. The method of claim 14, wherein the predetermined value is an inverse of a noise variance for a channel associated with transmission of the pseudo-random binary sequence.

17. The method of claim 14, further comprising using an analog to digital converter to provide the signal, wherein:
the seed value is recovered when a respective likelihood for every bit in the pseudo-random binary sequence is greater than the threshold; and
the predetermined value corresponds to the threshold divided by a magnitude of a normalized output range of the analog to digital converter.

18. The method of claim 10, wherein the seed value is recovered when a respective likelihood for every bit in the pseudo-random binary sequence is greater than the threshold.

* * * * *